US008386213B2

(12) United States Patent
Nagasaka

(10) Patent No.: US 8,386,213 B2
(45) Date of Patent: Feb. 26, 2013

(54) DEVICE, METHOD AND COMPUTER PROGRAM FOR SIMULATION OF COLLISION EVENTS BETWEEN PHYSICAL OBJECTS

(75) Inventor: Kenichiro Nagasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 1089 days.

(21) Appl. No.: 12/247,715

(22) Filed: Oct. 8, 2008

(65) Prior Publication Data

US 2009/0105997 A1    Apr. 23, 2009

(30) Foreign Application Priority Data

Oct. 19, 2007  (JP) ................. 2007-272097

(51) Int. Cl.
*G06F 7/60* (2006.01)
*G06F 17/10* (2006.01)
(52) U.S. Cl. ......................................... 703/2
(58) Field of Classification Search ....... 703/2; 700/245
See application file for complete search history.

(56) References Cited

U.S. PATENT DOCUMENTS

| 6,294,890 | B1 * | 9/2001 | Shimada et al. | 318/570 |
| 7,505,883 | B2 * | 3/2009 | Leprevost | 703/2 |

FOREIGN PATENT DOCUMENTS

| JP | 11-103507 A | 4/1999 |
| JP | 2007-102394 A | 4/2007 |
| JP | 2007-108955 A | 4/2007 |

OTHER PUBLICATIONS

Mirtich. "Impulse-based Dynamic Simulation of Rigid body Systems". 1992, 259 Pages.*
Sharf et al. "A contact force solution for non-colliding contact dynamics simulation", Springer science 2006., p. 263-290.*
Khatib "A Unified approach for Motion and Force control of Robot Manipulators: The Operational Space Formulation". 1987 IEEE. p. 43-53.*
Oda, Motion control studied to practical examples. J Society Instrument and Control Engineers., Japan. Society of Instrument and Control Engineers. Oct. 10, 2000;39(10):621-6.
Oishi et al., Motion control studied to practical examples. J Society Instrument and Contol Engineers, Japan. Society of Instrument and Control Engineers. Oct. 10, 2000;39(10):608-614.
Yoshida et al., A design of digital controller using disturbance observer for bilateral master-slave manipulator systems. Trans Soc Inst Cont Eng. 1993;29(4):437-46.

* cited by examiner

*Primary Examiner* — Eunhee Kim
(74) *Attorney, Agent, or Firm* — Wolf, Greenfield & Sacks, P.C.

(57) ABSTRACT

A dynamics simulation device for dynamically simulating physical interactions acting on a plurality of objects under an environment where the objects coexist is disclosed. The device includes: nominal value providing means for providing a nominal value $\Lambda_n$ of an operational space inertial matrix; nominal inertial force calculating means for calculating a nominal inertial force acting on the operational space by the use of the nominal value $\Lambda_n$ of the operational space inertial matrix and a target acceleration value of the physical quantity x; a disturbance observer estimating forces other than the nominal inertial force acting on the operational space as a disturbance; and means for calculating the force f acting on the physical quantity on the basis of the nominal inertial force and the estimated disturbance $f_d$.

11 Claims, 10 Drawing Sheets

DEVICE, METHOD AND COMPUTER PROGRAM FOR SIMULATION OF COLLISION EVENTS BETWEEN PHYSICAL OBJECTS

CROSS REFERENCES TO RELATED APPLICATIONS

This application claims priority to Japanese Patent Application No. JP 2007-272097 filed on Oct. 19, 2007, the entire contents of which is incorporated herein by reference.

BACKGROUND OF THE INVENTION

1. Field of the Invention

The present invention relates to a dynamics simulation device, a dynamics simulation method, and a computer program for allowing a computer to reproduce a physical interaction of collision or contact between objects under a virtual reality environment or a telepresence environment in which plural objects coexist, and more particularly, to a dynamics simulation device, a dynamics simulation method, and a computer program for calculating a contact force or a collision force acting between rigid bodies contacting or colliding with each other in a rigid body dynamics simulation.

More specifically, the invention relates to a dynamics simulation device, a dynamics simulation method, and a computer program for calculating an action force f acting on a collision point by treating contact or collision events between the objects in an operational space for describing relations between forces acting on the objects and accelerations generated therefrom and solving motion equations including linear equations on the operational space in which a force f acting on a physical quantity x and an acceleration generated therefrom are correlated with each other using an operational space inertial inverse matrix $\Lambda^{-1}$ and a linear complementary problem including linear inequality constraints applied to elements of the action forces f acting on collision points, and still more particularly, to a dynamics simulation device, a dynamics simulation method, and a computer program for calculating a vertical repulsive force $f_{Ni}$ and a frictional force $f_{Fi}$ acting on a collision point i by solving the linear complementary problem after calculating the operational space inertial inverse matrix $\Lambda^{-1}$.

2. Description of the Related Art

In the technical fields of games or virtual reality, there is a need for improvement in reality and interactivity of motion information based on physical laws using dynamics simulations in addition to visual information and audio information. In such a type of dynamics simulations, it is necessary to detect that a collision between cubes occurs and to apply a proper repulsive force on a collision point of the colliding objects.

As a method of detecting the collision between the objects, for example, in a situation where cubes contact or collide with each other, a contact shape calculating method of calculating a contact polygonal formed therebetween completely and at a high speed has been suggested (for example, see JP-A-2007-102394). In the contact shape calculating method, a contact plane having a vector connecting a representative pair of collision points detected by the use of a collision detecting algorithm as a normal vector is defined, a semi-contact polygon providing a contact shape with the contact plane every cube is acquired, and a common area of the semi-contact polygons of the cubes is calculated as a contact shape between the cubes. As shown in FIG. 9, in the example where two cubes collide with each other, a contact point indicated by C in the drawing is calculated.

A vertical repulsive force $f_N$ in the normal direction and frictional forces $f_{FX}$ and $f_{FY}$ perpendicular to each other in the direction perpendicular to the normal line act on the contact point C. In the dynamics simulation, the vertical repulsive force $f_N$ should be determined so that two cubes repel each other with a designated coefficient of restitution. Under an inequality constraint condition of "all the absolute values of the frictional forces $f_{FX}$ and $f_{FY}$ are equal to or smaller than a coefficient of friction $\mu \times f_N$", the frictional forces should be determined so that the relative velocity between two cubes is 0 (that is, so that the cubes stop by the balance of force).

When the value of the vertical repulsive force $f_N$ calculated by the dynamics simulation is too small, the cubes penetrate each other. On the contrary, when the value of the vertical repulsive force $f_N$ is too great, the cubes get apart from each other to cause the numerical divergence in some cases, thereby making the situation unstable. When the values of the frictional forces $f_{FX}$ and $f_{FY}$ calculated by the dynamics simulation are too small, one cube easily slides over the other cube and cannot stop. On the contrary, when the values of the frictional forces are too great, the numerical convergence is caused. In other words, it is necessary to calculate the vertical repulsive force $f_N$ and the frictional forces $f_{FX}$ and $f_{FY}$ with high precision in the dynamics simulation.

As a method of calculating the vertical repulsive force $f_N$ and the frictional forces $f_{FX}$ and $f_{FY}$ with high precision, a method called an "analysis type" is known. In the analysis type method, an external force allowing an object to reach a velocity after collision is determined in consideration of dynamics, and the calculation quantity becomes large but the external force can be calculated analytically with high accuracy.

Here, as an important concept for dynamics and motions, a concept called an "operational space" is known. The operational space is a space for describing relations between forces acting on objects and accelerations generated therefrom. The operations space is necessary when a way of contact between objects is used as constraints upon displaying a sense of force or controlling a force, not a position. The constraint condition can include, for example, a constraint on self interruption of a robot, a constraint on a joint movable angle, and an event that "a handle is fitted to an object" or "left and right eyes are horizontally balanced."

In a link structure in which rigid links are linked through joints, a vector formed by connecting all the values of the joints to each other is called a generalization variable q. When the differential value of the generalization variable q with respect to time is connected with Expression (1) using Jacobian J, an operational space for a physical quantity x can be defined. The Cartesian coordinates system for carrying out tasks such as fingertip position and posture of a manipulator is an example of the operational space (For example, see "A unified approach to motion and force control of robot manipulators" (The operational space formulation, IEEE Journal of Robotics and Automation, RA-3(1), pp. 43-53, 1987)).

$$\dot{x} = J\dot{q} \quad (1)$$

In general, it is known that the equation of motion of the entire link structure can be expressed by Expression (2).

$$\tau = H\ddot{q} + b - J^T f \quad (2)$$

In Expression (2), τ represents a generalization force corresponding to the generalization variable q, b represents the gravity and Coriolis force, f represents an external force acting on the operational space, and J represents Jacobian for correlating the operational space on which the external force f acts and the generalization variable q. By modifying Expression (2), the relation between the action force f and the acceleration (that is, two-step differential value of the physical quantity x with respect to time) generated in the action force direction (in the operational space) can be correlated with each other by the use of the equation of motion on the operational space expressed by Expression (3).

$$\ddot{x} = \Lambda^{-1} f + c \qquad (3)$$

In Expression (3), $\Lambda^{-1}$ is called an operational space inertial inverse matrix and is expressed by Expression (4).

$$\Lambda^{-1} = JH^{-1}J^T \qquad (4)$$

Here, H in Expression (4) represents an inertial matrix on the joint space of the entire structure. The relation between the acceleration and the force in the operational space is given by the operational space inertial inverse matrix $\Lambda^{-1}$.

In addition, c of the third term in the right member of Expression (3) corresponds to an operational space biasing acceleration (that is, an acceleration generated in the operational space when no external force acts) and is expressed by Expression (5).

$$c = JH^{-1}(\tau - b) + \dot{J}\dot{q} \qquad (5)$$

When a physical quantity x is considered as a variable obtained by arranging the operational space as a whole, the problem of calculating a repulsive force can be described as a linear constraint condition including Expression (6) as linear equality and Expressions (7) and (8) as inequalities.

$$\ddot{x} = \Lambda^{-1} f + c \qquad (6)$$

$$f_{N_i} \geq 0, \ddot{x}_{N_i} \geq 0 \text{ and } f_{N_i} \ddot{x}_{N_i} = 0 \qquad (7)$$

$$|f_{F_i}| \leq \mu_i f_{N_i}, f_{F_i} \ddot{x}_{F_i} \leq 0 \text{ and } \ddot{x}_{F_i}(\mu_i f_{N_i} - |f_{F_i}|) = 0 \qquad (8)$$

Expression (6) is an equation of motion (equal to Expression (3)) on the operational space in which the force f acting on the physical quantity x and the acceleration generated therefrom are correlated using the operational space inertial inverse matrix $\Lambda^{-1}$. Expressions (7) and (8) are linear inequality constraints given to the action force f. In Expressions (7) and (8), $f_{N_i}$ and $f_{F_i}$ represent the external force and the frictional force in the normal direction at the action point (collision point) due to the constraint on contact with an external system. $\mu_i$ represents a friction coefficient at the action point. Expression (7) as the inequality constraint represents a condition where a repulsive force acts between the cubes in the vertical repulsive force direction of the collision point i between the contacting cubes so as not to penetrate each other. Expression (8) as the inequality constraint represents a friction condition.

The linear simultaneous equations including Expressions (6) to (8) are called a linear complementary problem (LCP). When the operational space inertial inverse matrix $\Lambda^{-1}$ and the biasing acceleration c are known, the acceleration and the force f of x satisfying the conditions by solving the linear complementary problem. The mathematical solution of the linear complementary problem has been already suggested (for example, "Fast Contact Force Computation for Non-penetrating Rigid Bodies" (SIGGRAPH94, pp. 23-34, 1994)).

The operational space inertial inverse matrix $\Lambda^{-1}$ is a square matrix having the total number of repulsive forces (in other words, the total number of collision points between cubes) as an order, but the calculation cost for the calculation is great. In order to calculate the acceleration and the force f of x by solving the linear complementary problem after acquiring the operational space inertial inverse matrix $\Lambda^{-1}$, the same degree of calculation cost as the calculation of the operational space inertial inverse matrix $\Lambda^{-1}$ is necessary. The calculation cost increases with the increase in the number of collision points between the cubes.

By solving the linear complementary problem using the analysis type technique (LCP solver), it is possible to strictly calculate the repulsive force acting between the cubes contacting or colliding with each other, thereby enhancing the stability in numerical calculation. However, there is a problem in that the simulation decreases in speed with the increase in the number of collision points between the cubes.

On the other hand, opposite to the analysis type technique, a "penalty method" of suppressing the calculation amount at the sacrifice of calculation precision is also known. In the penalty method, the repulsive force is calculated by virtually generating the force of spring and damper corresponding to the penetrating depth between the cubes contacting or colliding with each other. That is, as shown in FIG. 10, the restoring force and the damping force of the spring are calculated to correspond to the penetrating depth. In the penalty method, since it is not necessary to calculate the giant matrices such as the operational space inertial inverse matrix $\Lambda^{-1}$ or to solve the linear complementary problem (Expressions (6) to (8)) after acquiring the operational space inertial inverse matrix $\Lambda^{-1}$ and the biasing acceleration c, it is possible to solve the force of collision at a high speed.

However, when it is intended to simulate the collision between the rigid bodies by the use of the penalty method, it is necessary to insert very strong spring and damper in FIG. 10, thereby easily causing the numerical divergence. In order to avoid the numerical divergence, a countermeasure of shortening the period of integration can be considered. However, in this case, the calculation speed may be lowered in comparison with the analysis type method.

Accordingly, in the rigidity dynamics simulation, there is a need for an algorithm for calculating the contact force or the collision force acting between the rigid bodies contacting or colliding with each other with high precision and low calculation cost. The repulsive force acting between the objects can be calculated with high precision using the analysis type method, but the calculation of the operational space inertial inverse matrix $\Lambda^{-1}$ or the calculation for solving the linear complementary problem serves as a bottle neck.

SUMMARY OF THE INVENTION

It is desirable to provide a dynamics simulation device, a dynamics simulation method, and a computer program that can calculate the contact force or collision force acting between rigid bodies contacting or colliding with each other with high precision and low calculation cost.

It is also desirable to provide a dynamics simulation device, a dynamics simulation method, and a computer program that can calculate an action force f acting on a collision point with high precision and at a high speed, by treating contact or collision events between the objects in an operational space for describing relations between forces acting on the objects and accelerations generated therefrom and solving motion equations including linear equations on the operational space in which a force f acting on a physical quantity x and an acceleration generated therefrom are correlated with each other using an operational space inertial inverse matrix $\Lambda^{-1}$ and a linear complementary problem including linear inequality constraints applied to the action forces f acting on collision points.

It is also desirable to provide a dynamics simulation device, a dynamics simulation method, and a computer program that can calculate a force f acting on a collision point with high precision and at a high speed, by solving a linear complementary problem after calculating an operational space inertial inverse matrix $\Lambda^{-1}$.

According to an embodiment of the invention, there is provided a dynamics simulation device for dynamically simulating physical interactions acting on a plurality of objects under an environment where the objects coexist, the dynamics simulation device including: on treating contact or collision events between the objects in an operational space for describing relations between forces acting on the objects and accelerations generated therefrom and solving motion equations including linear equations on the operational space in which a force f acting on a physical quantity x and an acceleration generated therefrom are correlated with each other using an operational space inertial inverse matrix $\Lambda^{-1}$ and a linear complementary problem including linear inequality constraints applied to elements of the action forces f acting on collision points, nominal value providing means for providing a nominal value $\Lambda_n$ of an operational space inertial matrix; nominal inertial force calculating means for calculating a nominal inertial force acting on the operational space by the use of the nominal value $\Lambda_n$ of the operational space inertial matrix; a disturbance observer estimating a force other than the nominal inertial force acting on the operational space; and means for calculating the force f acting on the physical quantity on the basis of the nominal inertial force and the estimated force other than the nominal inertial force.

In the technical fields of games or virtual reality, in order to accomplish the improvement in reality and interactivity of motion information based on physical laws, the dynamics simulation allowing a computer to reproduce the physical interactions such as contact or collision between the objects under the virtual environment where the plural objects coexist is carried out. In such a type of dynamics simulation, it is necessary to detect the collision between cubes and to allow a proper repulsive force to act on the collision point between the colliding objects.

For example, the contact shape calculating method suggested in JP-A-2007-102394 can be used as the method of detecting the collision between the cubes.

Subsequently, the vertical repulsive force or the frictional force acting on the detected collision point is calculated. However, when the calculated value of the vertical repulsive force is too small, the cubes penetrate each other. On the contrary, when the calculated value of the vertical repulsive force is too great, the cubes get apart from each other to cause the numerical divergence in some cases, thereby making the situation unstable. When the calculated values of the frictional forces are too small, one cube easily slides over the other cube. On the contrary, when the calculated values of the frictional forces are too great, the numerical convergence is caused. In other words, it is necessary to calculate the vertical repulsive force or the frictional forces acting on the collision point with high precision in the dynamics simulation.

The method of calculating the vertical repulsive force or the frictional force with high precision can include the analysis type method. Specifically, the problem of calculating the force acting on the cubes colliding with each other is treated in the operational space for describing the relation between the force acting on the objects and the acceleration generated therefrom. In this case, the force f acting on each collision point can be calculated by solving motion equations including linear equations on the operational space in which the force f acting on a physical quantity x and the acceleration generated therefrom are correlated with each other using the operational space inertial inverse matrix $\Lambda^{-1}$ and a linear complementary problem including linear inequality constraints applied to elements of the action forces f acting on collision points.

However, since the operational space inertial inverse matrix $\Lambda^{-1}$ is a square matrix having the total number of repulsive forces as the order, the calculation cost for the calculation is great. When it is intended to solve the linear complementary problem using the analysis type method, the repulsive force is calculated strictly and thus the stability in numerical calculation is high. However, the simulation speed is lowered with the increase in the number of collision points between the cubes.

On the contrary, in the dynamics simulation device according to the embodiment of the invention, a force control system in which the cubes collide with each other under the virtual environment or the remote environment is treated in the operational space, and the force f acting on each collision point is basically calculated by solving the linear complementary problem using the calculated and acquired operational space inertial inverse matrix $\Lambda^{-1}$. However, by replacing all or a part of the calculation of the operational space inertial inverse matrix $\Lambda^{-1}$ which is a bottleneck of the analysis type method or the solution of the linear complementary problem with the disturbance observer and a simply feedback control system based on the robust control, the contact force or the collision force between the cubes is calculated stably at a high speed.

In the dynamics simulation device according to the embodiment of the invention, the nominal inertial force acting on the operational space is calculated on the basis of the nominal value $\Lambda_n$ of the operational space inertial matrix and the target acceleration value of the physical quantity x, the force other than the nominal inertial force is estimated as the disturbance $f_d$ by the disturbance observer, and the force f acting on the physical quantity is calculated on the basis of the nominal inertial force and the estimated disturbance $f_d$.

Here, at the time of calculating the nominal inertial force, the target acceleration value can be calculated on the basis of the values of the operational space speed in the vertical repulsive force direction and the frictional force direction of the physical quantity x acquired from the integration result of the direct dynamics calculation.

The disturbance observer may estimate the disturbance $f_d$ by calculating the action force f by the use of a feedback calculation, calculating the acceleration of the physical quantity x from the action force f by the use of the direct dynamics calculation, and subtracting a value, which is obtained by multiplying the calculated acceleration of the physical quantity x by the nominal value $\Lambda_n$ of the operational space inertial matrix, from the action force f. At this time, the disturbance observer repeats the feedback calculation until a difference between the target acceleration value of the physical quantity x and the acceleration obtained by the direct dynamics calculation is sufficiently small.

A limiting process of applying the linear inequality constraint to the elements of the action force f may be further performed after calculating the action force f by the use of the feedback calculation.

The disturbance observer only feeds back an acceleration difference e and does not converge on the solution when the nominal value $\Lambda_n$ of the operational space inertial matrix greatly departs from the theoretical value. Accordingly, it is important that the nominal value $\Lambda_n$ of the operational space inertial matrix is given to a plant so that the calculation cost is not increased and the nominal value does not greatly depart from the theoretical value.

As a method of setting up the nominal operational space inertial inverse matrix $\Lambda_n$, it can be considered that a cross-inertia (off-diagonal element) of the operational space inertial matrix $\Lambda_n$ is set to zero and a theoretical value of only a diagonal element is calculated. In this case, the off-diagonal element of the operational space inertial matrix $\Lambda$ is treated as the disturbance. For example, by performing the direct dynamics calculation on all rows i of the operational space under the condition where a unit force (that is, $f=e_i$) is made to act on the i-th operational space, sequentially calculating the element of the i-th row and the i-th column of the operational space inertial inverse matrix $\Lambda^{-1}$, and taking the reciprocal thereof, the theoretical value of the diagonal element of the operational space inertial matrix $\Lambda$ can be calculated.

According to another embodiment of the invention, there is provided a computer-readable computer program for allowing a computer to perform a process of dynamically simulating physical interactions acting on a plurality of objects under an environment where the objects coexist, the computer program allowing the computer to serve as: on treating contact or collision events between the objects in an operational space for describing relations between forces acting on the objects and accelerations generated therefrom and solving motion equations including linear equations on the operational space in which a force f acting on a physical quantity x and an acceleration generated therefrom are correlated with each other using an operational space inertial inverse matrix $\Lambda^{-1}$ and a linear complementary problem including linear inequality constraints applied to respective elements of the action forces f acting on collision points, nominal value providing means for providing a nominal value $\Lambda_n$ of an operational space inertial matrix; nominal inertial force calculating means for calculating a nominal inertial force acting on the operational space by the use of the nominal value $\Lambda_n$ of the operational space inertial matrix and a target acceleration value of the physical quantity x; a disturbance observer estimating forces other than the nominal inertial force acting on the operational space as a disturbance $f_d$; and means for calculating the force f acting on the physical quantity on the basis of the nominal inertial force and the estimated disturbance $f_d$.

The computer program according to another embodiment of the invention defines a computer-readable computer program allowing a computer to perform a predetermined process. In other words, by installing the computer program according to the embodiment of the invention in the computer, the computer operates cooperatively to provide the same operational advantages as the dynamics simulation devices according to the above-mentioned embodiment of the invention.

According to the embodiments of the invention, it is possible to provide a dynamics simulation device, a dynamics simulation method, and a computer program that can calculate the contact force or collision force acting between rigid bodies contacting or colliding with each other in the rigidity dynamics simulation with high precision and low calculation cost.

According to the embodiments of the invention, it is possible to provide a dynamics simulation device, a dynamics simulation method, and a computer program that can calculate an action force f acting on a collision point with high precision and at a high speed, by treating contact or collision events between the objects in an operational space for describing relations between forces acting on the objects and accelerations generated therefrom and solving motion equations including linear equations on the operational space in which a force f acting on a physical quantity x and an acceleration generated therefrom are correlated with each other using an operational space inertial inverse matrix $\Lambda^{-1}$ and a linear complementary problem including linear inequality constraints applied to the action forces f acting on collision points.

According to the embodiments of the invention, it is also possible to provide a dynamics simulation device, a dynamics simulation method, and a computer program that can calculate a force f acting on a collision point with high precision and at a high speed, by solving a linear complementary problem after calculating an operational space inertial inverse matrix $\Lambda^{-1}$.

In the dynamics simulation device according to the above-mentioned embodiment of the invention, since all or a part of the calculation of the operational space inertial inverse matrix $\Lambda^{-1}$ which is a bottleneck of the analysis type method or the solution of the linear complementary problem are replaced with the disturbance observer and a simply feedback control system based on the robust control, the stability in numerical calculation and the decrease in calculation cost can be both accomplished. Accordingly, it is possible to enhance the speed of the entire rigidity dynamics simulation and thus to carry out the dynamics simulation on complex systems in real time.

Other embodiments, features, and advantages of the invention will be understood from the below-described embodiments of the invention and the detailed description with reference to the accompanying drawings.

DESCRIPTION OF THE PREFERRED EMBODIMENTS

Hereinafter, the embodiments of the invention will be described in detail with reference to the accompanying drawings.

The invention relates to dynamics simulation for allowing a computer to reproduce physical interactions such as collision and contact between objects in a space where plural objects coexist, and can be applied to a virtual reality (VR) system displaying a sense of force or a tactile sense for a manipulator, in addition to visual information and audio information.

Figure 1:
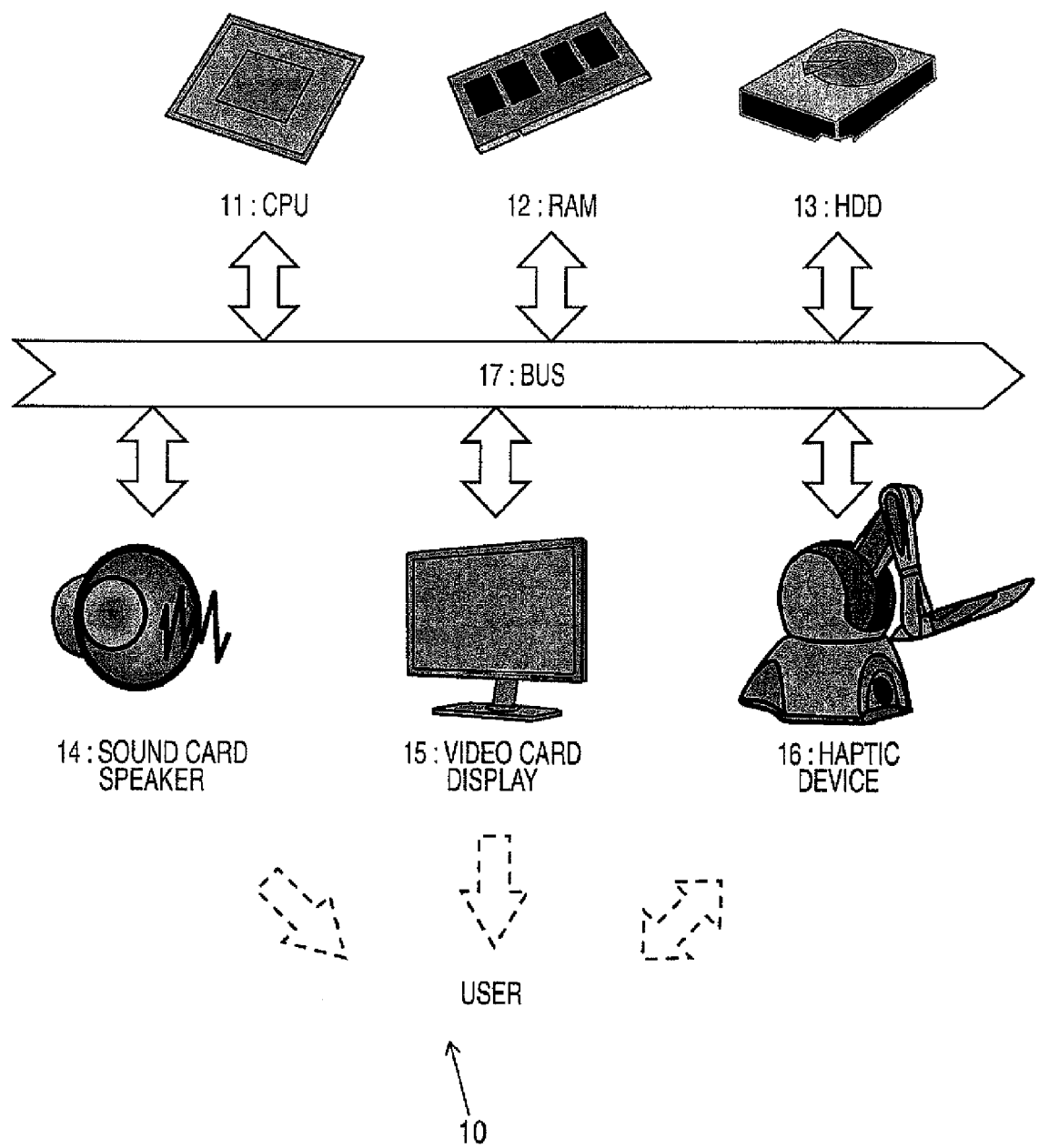
FIG. 1 is a diagram schematically illustrating a configuration of a VR system.

FIG. 1 schematically shows a configuration of a VR system 10. The VR system 10 displays a shape of a 3D space constructed in a computer for a user through a speaker 14, a display 15, a mouse (not shown), a force displayer (haptic device) 16.

The speaker 14 displays sound relating to events occurring in a 3D space (virtual reality space or telepresence space), the display 14 displays visual information of the 3D space, and the haptic device 16 displays the sense of force felt at the time of contacting with an object in the 3D space. In cooperation with the input and output systems, the 3D space constructed in the computer is displayed for a user with high reality as if it was an actual space. The speaker 14 is connected to a bus 17 through a sound card and the display 15 is connected to the bus 17 through a video card.

The invention is not limited to a method of constructing a specific haptic device 16. For example, in the specification of JP-A-2007-46580 assigned to the present applicant, a tactile force display is disclosed which includes a point of action for displaying a sense of force, an action force controller for controlling a force acting on the point of action, and an action point controller for controlling the position of the point of action and which excellently displays the point of action without any delay of time even in collision events discontinuously occurring, by driving a fingertip position controller in advance to predict points of collision to occur in the future even in a non-contact state and to set the predicted points of collision as the points of action. The tactile force display can be used as the haptic device 16.

Data and programs of the system 10 are stored in a hard disk driver (HDD) 13 and are developed as data on a virtual 3D space and programs therefor in a memory (RAM: Random Access Memory) 12 at the time of executing the programs. A variation of the virtual 3D space with the time, audio information, image information, and force information are calculated in real time by a CPU (Central Processing Unit) 11.

The audio information, the image information, and the force information calculated by the CPU 11 are displayed for a user through the speaker 14, the display 15, and the haptic device 16, respectively. The devices 14 and 15 are connected to a high-speed bus 17 having a speed enough to secure the real time property and can transmit and receive information.

Figure 2:
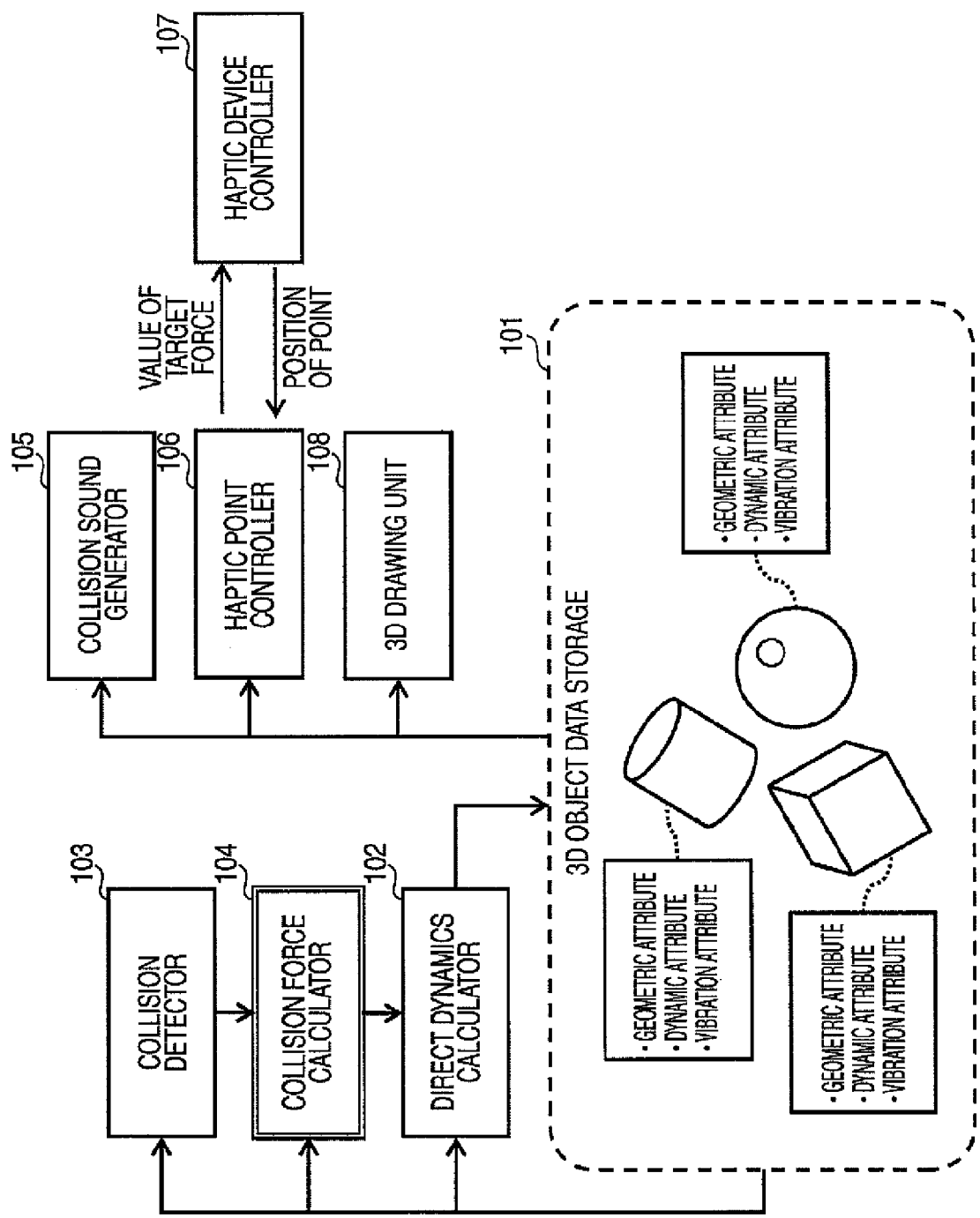
FIG. 2 is a diagram schematically illustrating a configuration of a control program executed by a CPU 11.

FIG. 2 schematically shows a configuration of a control program executed by the CPU 11.

The state of the virtual 3D space is stored in a 3D object data storage 101. The storage 101 stores at least data on geometric attributes such as position, posture, size, and connection of 3D objects coexisting in the virtual 3D space, dynamic attributes such as mass, inertial tensor, coefficients of friction, and coefficients of restitution, and vibration attributes such as a damping characteristic and a proper vibration waveform.

The objects in the 3D object data storage 101 are changed in position or posture depending on the dynamics calculation result in a direction dynamics calculator 102. The direct dynamics calculator 102 simulates the motion of an object on the basis of the Newton-Euler dynamics by calculating the acceleration generated in an object from a force generated in the object or a force externally acting on the object and integrating the acceleration. Then, by reflecting the direct dynamics calculation result in the position or posture of the object, for example, the objects displayed on the display 15 can exhibit real motions based on the dynamics laws.

The invention is not limited to the specific direct dynamics calculation method. For example, in JP-A-2007-108955 assigned to the present applicant, a direct dynamics calculation constructing method is disclosed which calculates the acceleration occurring in any position and in any direction, for example, under the condition of a force is made to act on a link structure such as a robot, by dividing the direct dynamics calculation into four steps and sequentially performing the calculation of inertia information-->the calculation of velocity information-->the calculation of force information-->the calculation of acceleration information. Here, plural forces may be made to act simultaneously or the accelerations of plural points may be calculated. This direct dynamics calculation method can be applied to the direct dynamics calculator 102 according to this embodiment.

A collision detector 103 detects the collision or interruption of the objects in the 3D object data storage 101 and calculates a set of collision points.

The invention is not limited to the specific collision detection method. For example, in JP-A-2007-102394 assigned to the present applicant, a contact polygon calculation method is disclosed which calculates a precise contact polygonal at a high speed by retrieving the periphery of a representative collision point pair (a most penetrated point pair or a closest point pair) acquired from a known collision detection algorithm. The collision detector 103 can employ the contact polygon calculation method.

A collision force calculator 104 calculates an external force acting on an object at the point of collision calculated by the collision detector 103 by the use of the dynamics calculation. The collision force calculator 104 basically calculates the action force f acting on each point of collision by treating an event of contact or collision between the objects in the virtual 3D space in the operational space and solving the linear complementary problem using the calculated and acquired operational space inertial inverse matrix $\Lambda^{-1}$. The calculation of the operational space inertial inverse matrix $\Lambda^{-1}$ or the solution of the linear complementary problem serves as a calculation bottleneck of the analysis type method. Therefore, in this embodiment, by replacing all or a part of the calculation of the operational space inertial inverse matrix $\Lambda^{-1}$ or the solution of the linear complementary problem with a disturbance observer and a simple feedback control system based on a robust control, the force of contact or collision between cubes can be calculated stably at a high speed, which will be described in detail later.

A collision sound generator 105 synthesizes collision sounds due to the force of collision acquired as the dynamics simulation result in the collision force calculator 104. The invention is not limited to the specific sound information calculating method. For example, in JP-A-2007-164291 assigned to the present applicant, a sound effect generating method is disclosed in which a precise sound effect with a sense of reality is calculated by adding a damping characteristic to an envelope waveform on the basis of the damping characteristics of the objects between which an physical interaction acts and synthesizing proper vibration waveforms of the objects with the envelope waveform. The sound effect generating method can be applied to the collision sound generator 105.

The haptic pointer controller 106 controls the position of a haptic pointer (not shown) depending on the variation in position of the point of operation of the haptic device 16. The force acting on the haptic pointer is transmitted to the haptic device 16.

A 3D drawing unit 108 stereoscopically draws and visualizes information on the 3D object and data. The 3D drawing information is displayed on the display 15. The 3D drawing process does not relate directly to the invention and thus is not described any more herein.

As described above, the collision force calculator 104 basically calculates the action force f acting on each point of collision by treating an event of contact or collision between the objects in the operational space and solving the linear complementary problem using the calculated and acquired operational space inertial inverse matrix $\Lambda^{-1}$. This embodiment is characterized in that the collision force calculator 104 calculates the repulsive forces acting on the objects with high precision and at a high speed. A method of constructing the collision force calculator 104 will be described in detail now.

In order to allow the haptic device 16 to display the force sense information felt at the time of directly contacting with an object in the 3D space, the collision force calculator 104 needs to strictly calculate the solution of the linear complementary problem including Expressions (6) to (8), that is, the action force f. As described above, since the operational space inertial inverse matrix $\Lambda^{-1}$ is a square matrix having the total number of repulsive forces as the order thereof, the calculation cost is great.

In order to reduce the calculation amount, it can be considered that the calculation of the operational space inertial inverse matrix $\Lambda^{-1}$ and the operational space biasing acceleration c is omitted, but the strictness of the solution f is sacrificed. On the contrary, in this embodiment, the collision force calculator 104 does not omit the calculation of the operational space inertial inverse matrix $\Lambda^{-1}$, but estimates and feedback-controls a difference of a given nominal value of the operational space inertial matrix from the actual value as a non-modeled disturbance by the use of the disturbance observer, thereby accomplishing both the strictness of solution or the stability of numerical calculation and the decrease in calculation cost.

Here, when the given nominal value of the operational space inertial matrix is $\Lambda_n$, the equation of motion on the operational space expressed by Expression (3) can be expressed as follows.

$$(\Lambda_n - \Delta\Lambda)\ddot{x} = f - f_c \tag{9}$$

Here, $\Delta\Lambda$ represents an estimation error of the operational space inertial matrix and $f_c$ is a nonlinear term including unknown gravity, Coriolis force, and centrifugal force. By rewriting Expression (9), the nominal force of inertia can be expressed by Expression (10).

$$\Lambda_n \ddot{x} = f - f_d \tag{10}$$

Here, $f_d$ in Expression (10) is expressed as follows.

$$f_d = f_c + \Delta\Lambda \ddot{x} \tag{11}$$

$f_d$ is a force other than the nominal force of inertia acting on the operational space and is a disturbance from the point of view of the nominal value. By estimating the value by the use of the disturbance observer, the force of action f can be simply calculated from Expression (9) as follows.

$$f = \Lambda_n \ddot{x}^{ref} + f_d \tag{12}$$

Two-step differentiation of the target value $x^{ref}$ of the physical quantity with respect to the time is the target acceleration value necessary for the operational space. When the event of contact or collision between the objects is treated in the operational space, the target acceleration value has elements in the vertical repulsive force direction and the frictional force direction every point of contact i.

$$\ddot{x}^{ref} = \begin{bmatrix} \vdots \\ \ddot{x}_{N_i}^{ref} \\ \ddot{x}_{F_i}^{ref} \\ \vdots \end{bmatrix} \tag{13}$$

The target acceleration values in the vertical repulsive force direction and the frictional force direction of the i-th contact point are as follows. Here, $V_i$ is a coefficient of restitution at the i-th contact point. In this way, the acceleration allowing the objects contacting or colliding with each other not to penetrate each other is given as the target value in the vertical repulsive force direction. The acceleration allowing the objects not to slide is given as the target value in the frictional force direction. When the target value is given, the target acceleration value of the physical quantity can be treated as being known.

$$\ddot{x}_{N_i}^{ref} = -(1+v_i)\dot{x}_{N_i}/\delta t \tag{14}$$

$$\ddot{x}_{F_i}^{ref} = -\dot{x}_{F_i}/\delta t \tag{15}$$

The right members of Expressions (14) and (15) include the operational space velocity in the vertical repulsive force direction and the frictional force direction, but the values can be obtained at once from the integration result of the direct dynamics calculation with respect to the time.

It is a problem how to estimate the disturbance expressed by Expression (11). By using Expression (10), the disturbance $f_d$ acting on the operational space can be expressed by Expression (16).

$$f_d = f - \Lambda_n \ddot{x} \tag{16}$$

Accordingly, the disturbance $f_d$ can be estimated from the force f acting on the physical quantity x and the acceleration of the physical quantity x generated in the operational space. Actually, as described later, only the low-frequency component of the disturbance $f_d$ can be estimated by the use of a low-pass filter.

In view of Expressions (9) to (16), the solution f can be obtained by Expression (12) without directly solving the linear complementary problem of Expressions (6) to (8). That is, since the solution of the linear complementary problem can be omitted, it is possible to further reduce the calculation amount.

Figure 3:
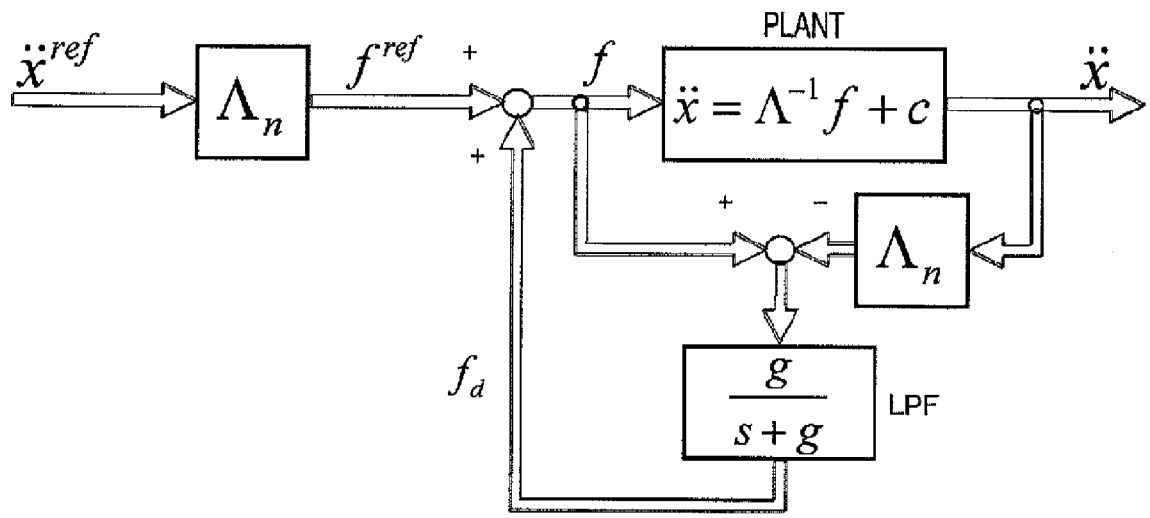
FIG. 3 is a block diagram illustrating a disturbance observer.

FIG. 3 is a block diagram illustrating the disturbance observer for performing the above-mentioned processes.

By multiplying the target acceleration value of the physical quantity by the nominal value $\Lambda_n$ of the operational space inertial matrix, the target force value $f^{ref}$ applied to a control object, that is, a plant, is obtained. The force f obtained by adding the disturbance $f_d$ to the target force $f^{ref}$ actually acts on the plant.

The plant model is a calculation for acquiring the dynamics of the operational space, that is, the left member from the right member of Expression (3). When the force f is substituted, the acceleration of the physical quantity x is output.

By subtracting the value, which is obtained by multiplying the acceleration output from the plant by the nominal value $\Lambda_n$ of the operational space inertial matrix, from the force f acting on the plant, the disturbance $f_d$ is calculated as expressed by Expression (16). The low-pass filter (LPF) indicated by g/(s+g) in the drawing serves to prevent the divergence of the system.

The disturbance $f_d$ is fed back and the force f obtained by adding the disturbance $f_d$ to the target value $f^{ref}$ acts on the plant.

The disturbance observer can be referred to, for example, "Robust Motion Control by Disturbance Observer", Robotics Society of Japan, vol. 11, No. 4, pp 486-493, 1993. The disturbance observer can accomplish a target state in spite of the variation in unknown parameter or the disturbance in the plant, by estimating and feeding back the disturbance component in the plant to the control input. However, in order to correctly estimate the disturbance, it is necessary to repeat the feedback calculation over plural cycles.

The model of the plant shown in FIG. 3 is a calculation acquiring the left member from the right member of Expression (3), that is, a calculation for calculating the acceleration occurring in the operational space (point of collision) at the time of action of the repulsive force, but is also a problem of calculating the acceleration in the operational space when an external force or a generalization force, the gravity, and a force relating to the sum of velocity (Coriolis force) act. This problem is different from the general direct dynamics calculation in that the acceleration in the operational space is calculated, but can be understood as a kind of direct dynamics calculation. The direct dynamics calculation FWD has a joint model as a dynamics model of a link structure, a velocity of the joints, the generalization force τ, the gravity g, and the action force f as parameters, and can be expressed by Expression (17).

$$\ddot{x} = FWD(q, \dot{q}, \tau, g, f) \quad (17)$$

The basic direct dynamics calculation can be referred to, for example, "Efficient Dynamic Computer Simulation of Robotic Mechanisms" (Journal of Dynamic Systems, Measurement and Control, pp. 205-211, 1982).

In the feedback calculation of the disturbance observer, a process of calculating the repulsive force f, performing the direct dynamics calculation using Expression (17) to calculate the acceleration of the physical quantity x, solving Expression (16) to obtain the disturbance $f_d$, and updating the value of the repulsive force using Expression (12) is repeated. The disturbance estimation value in the k-th cycle of the repeating calculation, $f_{dk}$, is expressed as Expression (18) described below using Expression (12) and the Expression (16).

$$f_{dk} = \Lambda_n \ddot{x}^{ref} + f_{dk-1} - \Lambda_n \ddot{x} = f_{dk-1} + \Lambda_n (\ddot{x}^{ref} - \ddot{x}) \quad (18)$$

Here, the error (acceleration difference) e between the target acceleration for the target value of the physical quantity x and the acceleration of the physical quantity x obtained as the result of the direct dynamics calculation is defined by Expression (19).

$$e = \ddot{x}^{ref} - \ddot{x} \quad (19)$$

Then, the expression for updating the disturbance in the feedback calculation by the disturbance observer can be reflexively expressed by Expression (20) using the error e. Here, in order to secure the stability in shape, the low-pass filter is inserted to estimate only the low-frequency component of the disturbance $f_d$.

$$f_d = f_d + \frac{g}{s+g} \Lambda_n e \quad (20)$$

The condition for ending the repetition of the feedback calculation is that the acceleration difference e is sufficiently small as expressed by Expression (21) (where ϵ is a positive real number)

$$|e| < \epsilon \quad (21)$$

In JP-A-2007-108955, a method of performing the direct dynamics calculation with the first order (O(N), O(M)) of the dimension N of the generalization variable q and the dimension M of f is suggested based on the method described in "The calculation of robot dynamics using articulated-body inertias" (Int. J. Robotics Research, vol. 2, no. 1, pp. 13-30, 1983). It is possible to efficiently perform the direct dynamics calculation by the use of the high-speed direct dynamics calculation.

In the above description, only the equation of motion of Expression (6) of the linear complementary problem including Expressions (6) to (8) is mentioned, but Expressions (7) and (8) as the inequality constraints are not considered. As a method of adding the inequality constraint, a method of adding the limiting process expressed by Expressions (22) and (23) after calculating the repulsive force f of Expression (12) in the repeated calculation can be considered.

$$f_{N_i} = \max(0, f_{N_i}) \quad (22)$$

$$f_{F_i} = \min(\max(-\mu_i f_{N_i}, f_{F_i}), \mu_i f_{N_i}) \quad (23)$$

In the above expressions, min(x,y) and max(x,y) indicate the smaller value and the greater value of x and y, respectively. Expression (22) means a constraint that the vertical repulsive force $f_{N_i}$ acting on the point of contact i is not negative. Expression (23) means a constraint that the frictional force $f_{F_i}$ acting on the point of action i is smaller than the friction coefficient $\mu_i \times$ the vertical repulsive force $f_{N_i}$.

Regarding the repulsive forces $f_{N_i}$ and $f_{F_i}$ satisfying Expressions (24) to (26), since the acceleration difference exists but Expressions (7) and (8) as the inequality constraints are satisfied, the error is considered as 0. That is, at the i-th contact point, when several conditions of Expressions (24) to (26) are satisfied, the acceleration error is set to $e_i$=0. Expressions (24) to (26) correspond to the allowable range of the error $e_i$.

$$f_{N_i} = 0 \text{ and } \ddot{x}_i > 0 \quad (24)$$

$$f_{F_i} = \mu_i f_{N_i} \text{ and } \ddot{x}_i < 0 \quad (25)$$

$$f_{F_i} = -\mu_i f_{N_i} \text{ and } \ddot{x}_i > 0 \quad (26)$$

The mathematical verification of converging on the solution using the method of reflecting the inequality constraints is not obtained, but the inventor confirmed that the solution is obtained experimentally.

The disturbance observer only feeds back an acceleration difference e and does not converge on the solution when the nominal value $\Lambda_n$ of the operational space inertial matrix greatly departs from the theoretical value. Accordingly, it is important that the nominal value $\Lambda_n$ of the operational space inertial matrix is given to a plant so that the calculation is not enhanced and the nominal value does not greatly depart from the theoretical value. Here, it is considered that the cross inertia (off diagonal element) of the operational space inertial matrix is zero and the theoretical values of the only the diagonal elements are calculated. In other words, the off-diagonal elements of the operational space inertial matrix Λ are treated as the disturbance. (The diagonal elements of the operational space inertial matrix correspond to the displacements of the physical quantity in the action force applying direction and the off-diagonal elements correspond to the displacements of the physical quantity in the other directions due to the force of action.)

In JP-A-2007-108955 assigned to the present applicant, it is described that the i-th row of the operational space inertial inverse matrix $\Lambda^{-1}$ can be obtained by performing the direct dynamics calculation under the condition that the unit force (that is $f=e_i$) is made to act only on the i-th operation space and thus the entire operational space inertial inverse matrix $\Lambda^{-1}$ is obtained by performing the calculation of Expression (27) on all the rows i.

$$(\text{i-th row of } \Lambda-1) = FWD(q,0,0,0,e_i) \quad (27)$$

Expression (27) uses the fact that the i-th row of the operational space inertial inverse matrix $\Lambda^{-1}$ is matched with the acceleration generated in the each operational space when the unit force is made to act on the i-th operational space. The diagonal element of the operational space inertial matrix Λ is expressed by Expression (28), on the basis of the same expression.

$$\Lambda_{n_{ii}} = 1.0/FWD(q,0,0,0,e_i)_i \quad (28)$$

Since the off-diagonal elements are 0, the following expression is obtained.

$$\Lambda_{n_{ij}}(i \neq j) = 0.0 \quad (29)$$

In JP-A-2007-108955 assigned to the present applicant, a direct dynamics calculation constructing method optimized for the calculation of the operational space inertial inverse matrix is also described. In the calculation method, it is possible to calculate all the diagonal elements with the first order of the dimension N of the generalization variable q and the dimension M of the action force f (O(N), O(M)). That is, the calculation of the diagonal elements of the operational space inertial matrix Λ does not cause the great increase in calculation amount.

Figure 4:
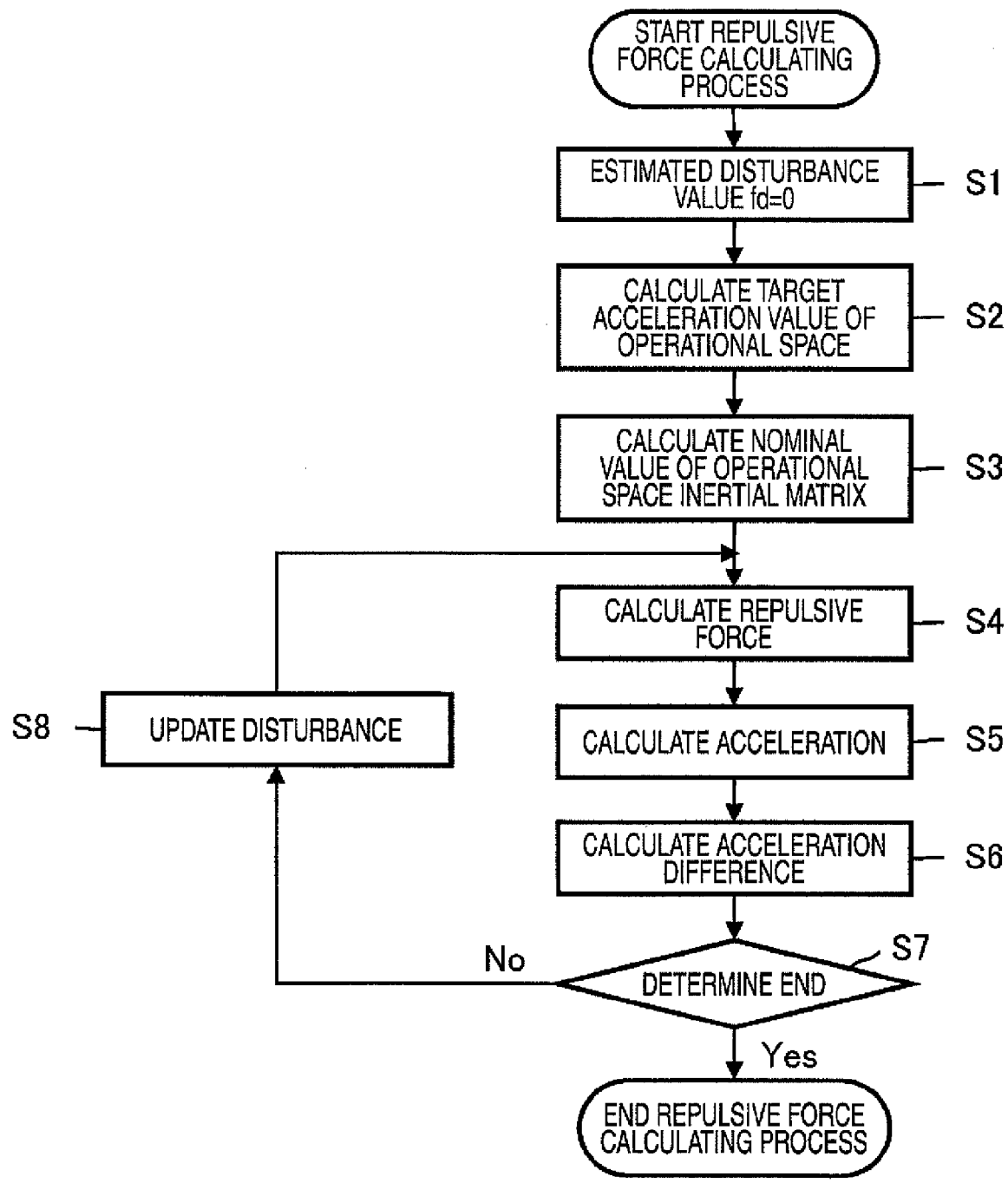
FIG. 4 is a flowchart illustrating a procedure of processes executed by a collision force calculator 104.

FIG. 4 is a flowchart illustrating a procedure of processes performed by the collision force calculator 104.

First, the estimated disturbance value $f_d$ is reset to 0 (step S1) and then the target acceleration values in the repulsive force directions of the physical quantity x are set up (step S2). In the above-mentioned example, the target acceleration values in the vertical repulsive force direction and the frictional force direction are calculated on the basis of Expressions (14) and (15).

Then, the nominal value $\Lambda_n$ of the operational space inertial matrix is calculated (step S3). In the above-mentioned example, only the diagonal elements are strictly calculated on the basis of Expressions (27) and 28 using the direct dynamics calculation.

Then, the repulsive forces f acting on the operational spaces are calculated on the basis of Expression (12) (step S4). However, the limiting process of Expressions (22) and (23) is performed to consider the inequality constraint.

The acceleration of the physical quantity x generated when the repulsive force f is made to act on the plant is calculated (step S5). Specifically, the direct dynamics calculation based on Expression (17) is performed using the repulsive force f obtained in step S4, thereby calculating the accelerations of the physical quantity x generated in the operational spaces.

The acceleration error e generated in the operational space is calculated on the basis of Expression (19) (step S6).

However, the components corresponding to the conditions of Expressions (24) to (26) are set to $e_i=0$ to consider the inequality constraints.

In step S7, the end of the feedback calculation repeated in the disturbance observer is determined on the basis of Expression (21). Here, when the ending condition is satisfied, the repulsive force calculating process is ended. On the other hand, when the ending condition is not satisfied, the process of step S8 is performed.

In step S8, the estimated disturbance value $f_d$ is updated on the basis of Expression (20). Thereafter, the process of step S4 is performed again.

By repeating the above-mentioned processes, it is possible to determine the repulsive forces to act on the points of collision with high precision and at a high speed.

In the repulsive force calculating algorithm according to this embodiment, it is possible to properly solve an unknown force determining problem in a partner-type robot force control system such as a human type. (In this case, an object grasped by a robot or the links constituting the base of the robot such as an end effector grasping an object correspond to the 3D objects stored in the 3D object and data storage 101.)

Figure 5:
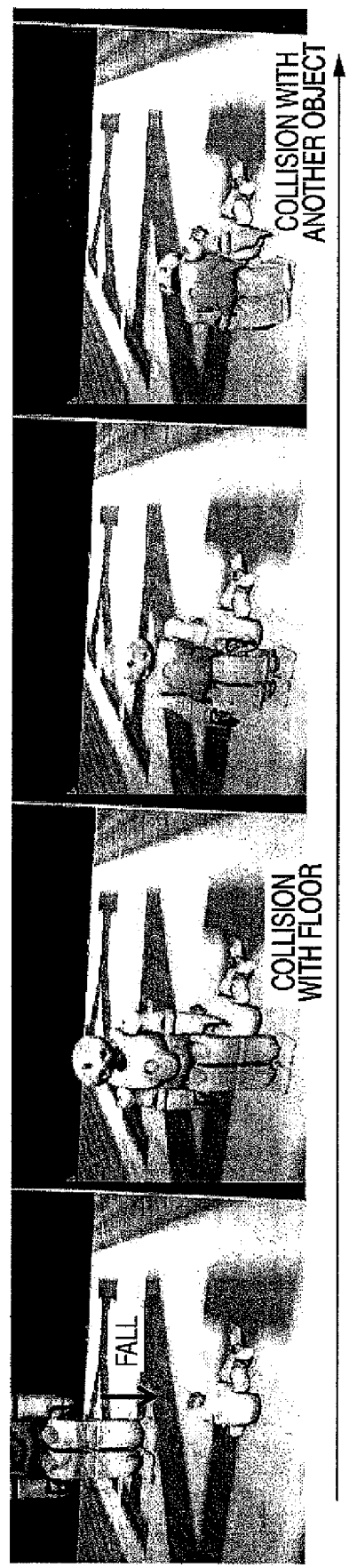
FIG. 5 is a diagram illustrating an example where a system having plural robots coexisting is simulated using a repulsive force calculating algorithm according to an embodiment of the invention.
Figure 6:
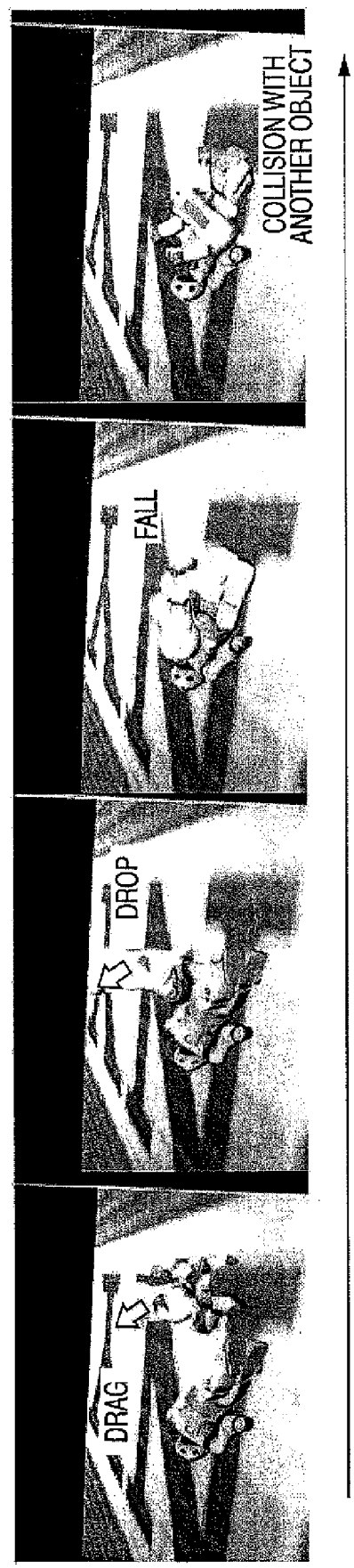
FIG. 6 is a diagram illustrating another example where a system having plural robots coexisting is simulated using a repulsive force calculating algorithm according to an embodiment of the invention.

FIGS. 5 and 6 are diagrams illustrating an example where a system having plural robots coexisting is simulated using the repulsive force calculating algorithm according to this embodiment.

FIG. 5 shows an example where a human type robot falls from the upside, collides with the floor, and then collides with a dog-type robot. It can be seen that the simulation is performed without diverging by the collision between the complex structures.

FIG. 6 shows an example where the dog-type robot is dragged and dropped using the haptic device. By allowing the force for accomplishing the relative velocity=0 to act between the haptic point and the dog-type robot, the drag can be embodied.

In the above-mentioned example, the disturbance observer is applied to the determination of collision and repulsive forces. By solving Expression (12) as the standard repulsive force updating equation and Expression (19) as the error calculating equation without the inequality constraint, the algorithm according to the invention may be applied to the determination of the external force for embodying any motion of an object.

Figure 7:
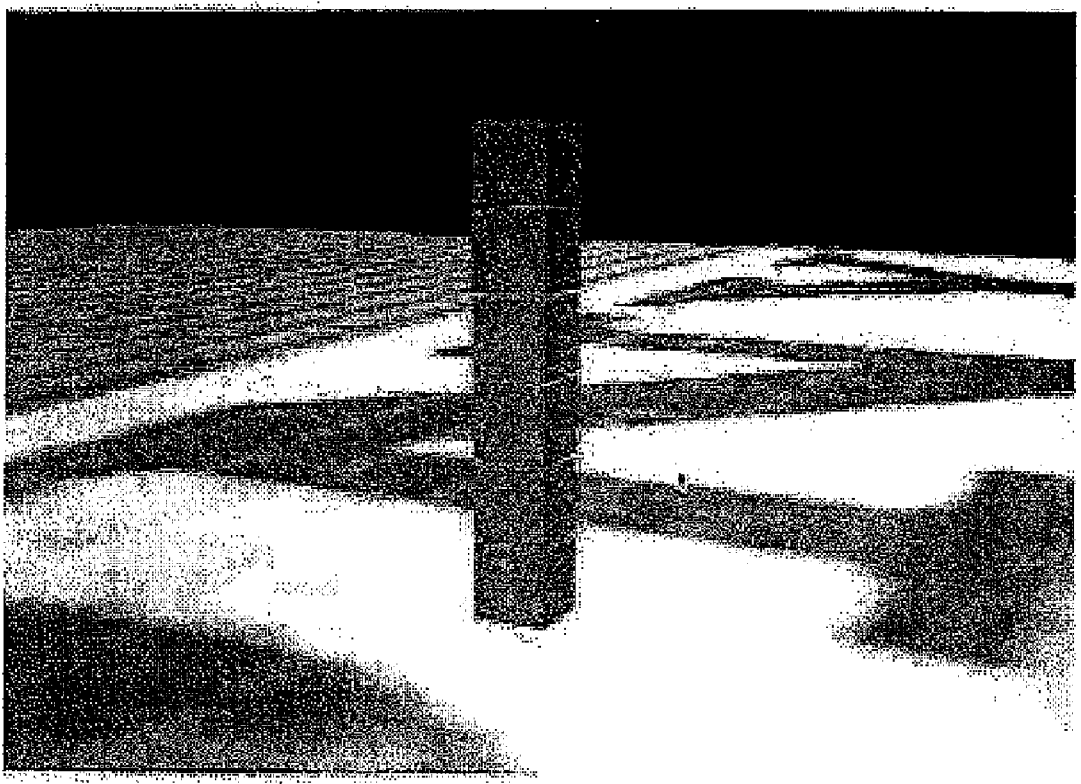
FIG. 7 is a diagram illustrating an example where cubes are piled up using an algorithm according to an embodiment of the invention.
Figure 8:
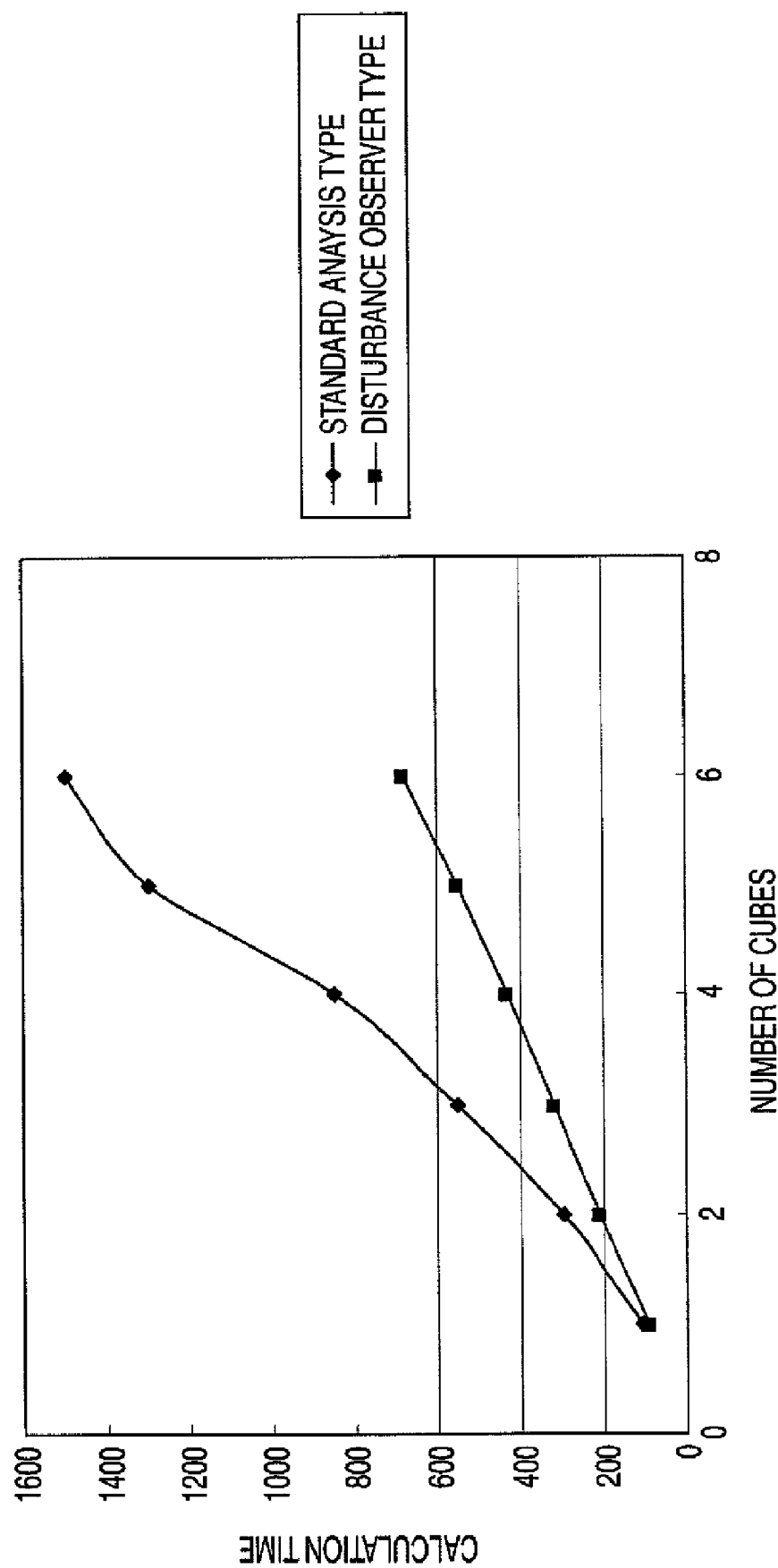
FIG. 8 is a diagram illustrating the measurement result of execution time per simulation step when a known analysis type method is carried out and when the algorithm according to the embodiment of the invention is carried out while increasing the number of cubes.
Figure 9:
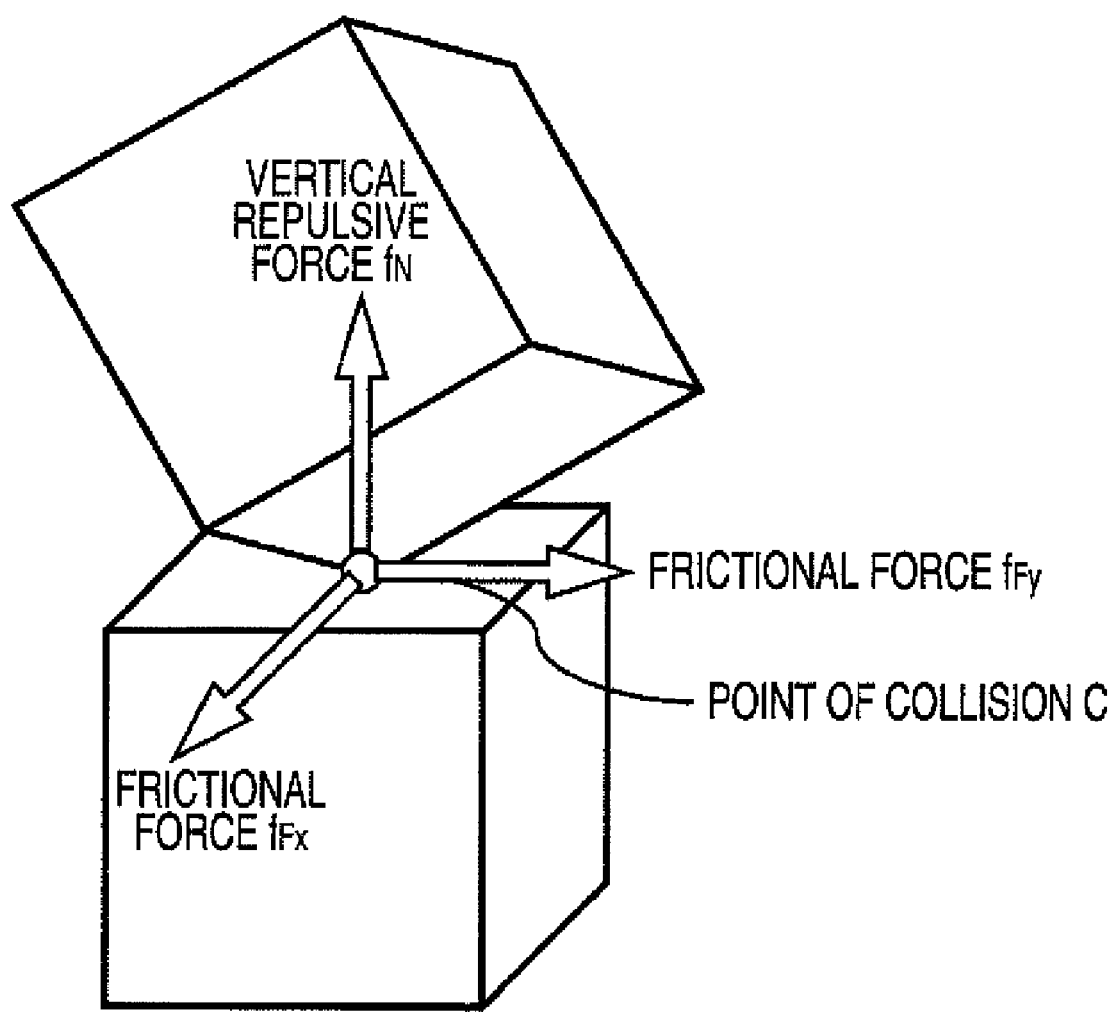
FIG. 9 is a diagram illustrating a method of detecting a collision between cubes.
Figure 10:
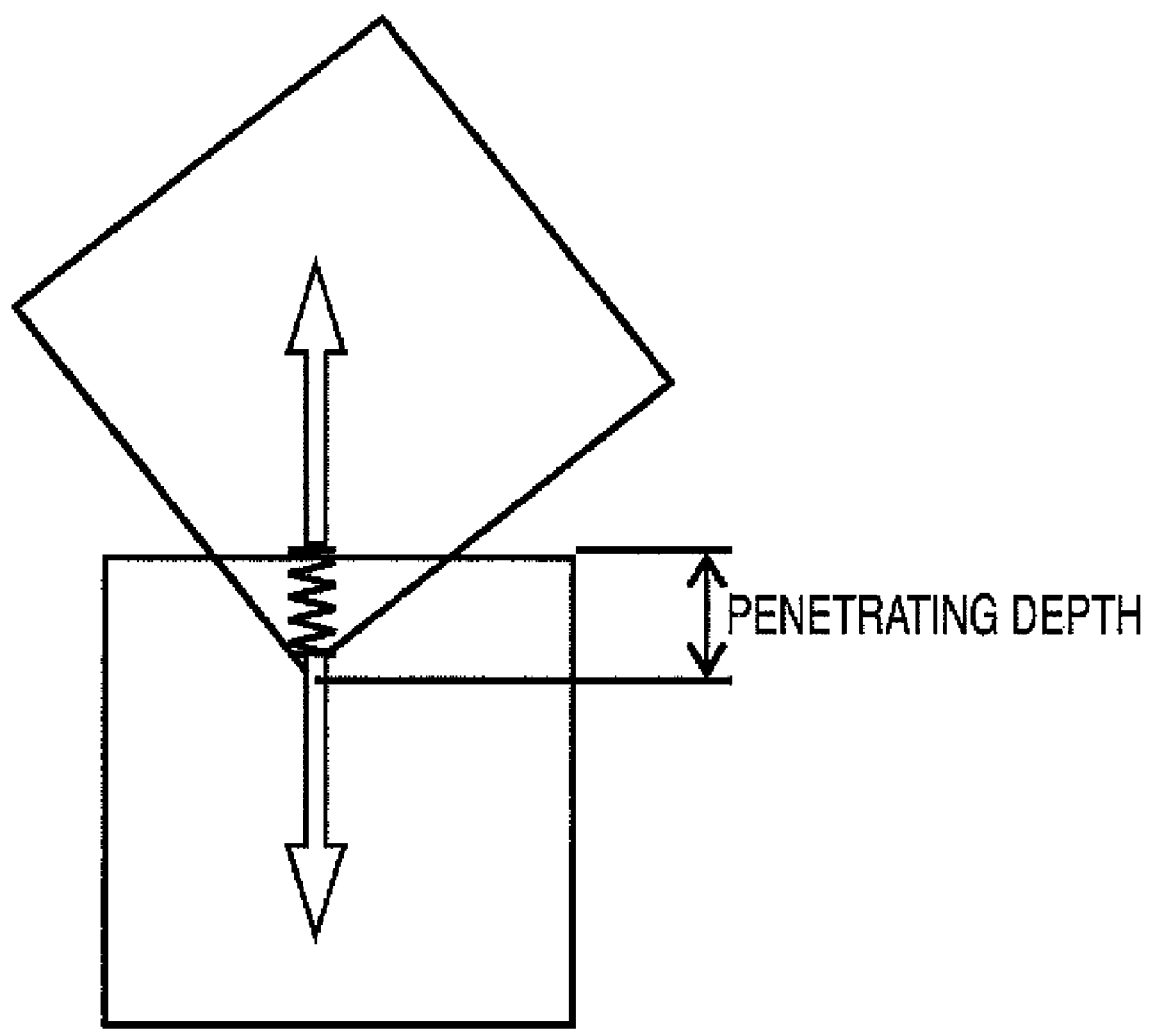
FIG. 10 is a diagram illustrating an example where forces of a spring and a damper are virtually generated to correspond to a penetrating depth between cubes contacting or colliding with each other.

FIG. 7 shows an example where cubes are piled using the algorithm according to the embodiment of the invention. FIG. 8 shows the measurement result of execution time per simulation step when a known analysis type method is carried out and when the algorithm according to the embodiment of the invention is carried out while increasing the number of cubes. In the algorithm according to the embodiment of the invention, it can be seen that the calculation amount is reduced in comparison with the standard analysis type.

Although the invention has been described in detail with reference the specific embodiments, it should be obvious that those skilled in the art can modify or change the embodiments without departing from the gist of the invention.

The invention can be applied to the haptic device for displaying a sense of force for a user, the VR system for displaying a sense of virtual reality, the unknown force determination problem in a force-control system of a partner-type robot, the motion control of a CG character, and other various systems for an intelligent solution for giving a desired motion constraint to an object. For example, when the invention is applied to the motion control of a robot or the motion control of a CG character, it is possible to do stable and efficient inverse kinematics manipulations.

The above-mentioned embodiments are only examples of the invention, and the details of this specification should not be restrictively understood. The appended claims should be referred to for understanding of the gist of the invention.

What is claimed is:

1. A dynamics simulation device for dynamically simulating physical interactions acting on a plurality of objects under an environment where the objects coexist, the device simulating contact or collision events between the plurality of objects in an operational space for describing relations between forces acting on the plurality of objects and accelerations generated therefrom and solving motion equations including linear equations on the operational space, in which a force f acting on a physical quantity x and an acceleration generated therefrom are correlated with each other using an inverse operational space inertial matrix $\Lambda^{-1}$ and a linear complementary problem including linear inequality constraints applied to respective elements of action forces acting on collision points, the device comprising:

a nominal value providing unit configured to provide a nominal value $\Lambda_n$ of an operational space inertial matrix;

a nominal inertial force calculating unit configured to calculate a nominal inertial force acting on the operational space based at least in part on the nominal value $\Lambda_n$ of the operational space inertial matrix and a target acceleration value of the physical quantity x;

a disturbance observer estimating forces other than the nominal inertial force acting on the operational space as a disturbance $f_d$; and a calculation unit, comprising at least one processor, configured to calculate the force f acting on the physical quantity x on the basis of the nominal inertial force and the estimated disturbance $f_d$.

2. The dynamics simulation device according to claim 1, wherein the target acceleration value of the physical quantity x has elements in a vertical repulsive force direction and a frictional force direction for every contact point between the objects contacting or colliding with each other, and wherein the nominal inertial force unit is further configured to calculate the target acceleration value on the basis of values of an operational space velocity in the vertical repulsive force direction and the frictional force direction of the physical quantity x acquired from an integration result of a direct dynamics calculation.

3. The dynamics simulation device according to claim 1, wherein the disturbance observer estimates the disturbance $f_d$ on the basis of the force f acting on the physical quantity x and the acceleration of the physical quantity x generated in the operational space.

4. The dynamics simulation device according to claim 1, wherein the disturbance observer estimates the disturbance $f_d$ by calculating the force f using a feedback calculation, calculating the acceleration of the physical quantity x from the force f based at least in part on a direct dynamics calculation, and subtracting a value, which is obtained by multiplying the calculated acceleration of the physical quantity x by the nominal value $\Lambda_n$ of the operational space inertial matrix, from the force f.

5. The dynamics simulation device according to claim 4, wherein the disturbance observer repeats the feedback calculation until a difference between the target acceleration value of the physical quantity x and the acceleration obtained by the direct dynamics calculation is less than a cutoff value.

6. The dynamics simulation device according to claim 5, further comprising a constraint unit configured to perform a limiting process of applying a linear inequality constraint to the respective elements of the force f after calculating the force f by the use of the feedback calculation.

7. The dynamics simulation device according to claim 1, wherein the nominal value unit is further configured to set a cross-inertia (off-diagonal element) of the operational space inertial matrix $\Lambda$ to zero and to calculate a theoretical value of only a diagonal element.

8. The dynamic simulation device according to claim 7, wherein the nominal value unit is further configured to:

perform a direct dynamics calculation on all rows i of the operational space matrix under a condition where a unit force (that is, $f=e_i$) is made to act on the i-th operational space, sequentially calculate the element of the i-th row and the i-th column of the inverse operational space inertial matrix $\Lambda^{-1}$, and calculate the theoretical value of the diagonal element of the operational space inertial matrix $\Lambda$ from the diagonal component of the inverse operational space inertial matrix $\Lambda^{-1}$.

9. A dynamics simulation method of dynamically simulating physical interactions acting on a plurality of objects under an environment where the plurality of objects coexist, the method simulating contact or collision events between the plurality of objects in an operational space for describing relations between forces acting on the objects and accelerations generated therefrom and solving motion equations including linear equations on the operational space, in which a force f acting on a physical quantity x and an acceleration generated therefrom are correlated with each other using an inverse operational space inertial matrix $\Lambda^{-1}$ and a linear complementary problem including linear inequality constraints applied to elements of action forces acting on collision points, the method comprising:

providing a nominal value $\Lambda_n$ of an operational space inertial matrix;

calculating a nominal inertial force acting on the operational space by the use of the nominal value $\Lambda_n$ of the operational space inertial matrix and a target acceleration value of the physical quantity x;

estimating forces other than the nominal inertial force acting on the operational space as a disturbance $f_d$; and calculating the force f acting on the physical quantity x on the basis of the nominal inertial force and the estimated disturbance $f_d$.

10. A non-transitory computer-readable medium having stored thereon a computer program that, when executed by a machine, causes the machine to perform a method of dynamically simulating physical interactions acting on a plurality of objects under an environment where the objects coexist, the method adapting the computer to simulate contact or collision events between the plurality of objects in an operational space for describing relations between forces acting on the plurality of objects and accelerations generated therefrom and solving motion equations including linear equations on the operational space, in which a force f acting on a physical quantity x and an acceleration generated therefrom are correlated with each other using an inverse operational space inertial matrix $\Lambda^{-1}$ and a linear complementary problem including linear inequality constraints applied to elements of action forces acting on collision points, the method comprising:

providing a nominal value $\Lambda_n$ of an operational space inertial matrix;

calculating a nominal inertial force acting on the operational space by the use of the nominal value $\Lambda_n$ of the operational space inertial matrix and a target acceleration value of the physical quantity x;

estimating forces other than the nominal inertial force acting on the operational space as a disturbance $f_d$; and the force f acting on the physical quantity x on the basis of the nominal inertial force and the estimated disturbance $f_d$.

11. A dynamics simulation device for dynamically simulating physical interactions acting on a plurality of objects, the device simulating contact or collision events between the plurality of objects in an operational space for describing relations between forces acting on the plurality of objects, the device comprising:

a nominal value providing unit configured to provide a nominal value $\Lambda_n$ of an operational space inertial matrix;

a nominal inertial force calculating unit configured to calculate a nominal inertial force acting on the operational space by the use of the nominal value $\Lambda_n$ of the operational space inertial matrix and a target acceleration value of a physical quantity x;

a disturbance observer estimating forces other than the nominal inertial force acting on the operational space as a disturbance $f_d$; and a calculation unit, comprising at least one processor, configured to calculate a force f acting on the physical quantity x on the basis of the nominal inertial force and the estimated disturbance $f_d$.

* * * * *